United States Patent
Chou et al.

(10) Patent No.: US 9,033,324 B2
(45) Date of Patent: May 19, 2015

(54) ROTATING CYLINDER

(71) Applicants: Yu-Cheng Chou, New Taipei (TW); Xiao-Feng Wu, Shenzhen (CN)

(72) Inventors: Yu-Cheng Chou, New Taipei (TW); Xiao-Feng Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 391 days.

(21) Appl. No.: 13/661,916

(22) Filed: Oct. 26, 2012

(65) Prior Publication Data

US 2013/0168911 A1    Jul. 4, 2013

(30) Foreign Application Priority Data

Dec. 29, 2011    (CN) .......................... 2011 1 0450560

(51) Int. Cl.
    *B23Q 3/08*     (2006.01)
    *B25B 1/14*     (2006.01)
    *B23Q 3/06*     (2006.01)

(52) U.S. Cl.
    CPC ................ *B23Q 3/082* (2013.01); *B23Q 3/069* (2013.01)

(58) Field of Classification Search
    USPC ........................................ 269/24–27, 228, 32
    See application file for complete search history.

(56) References Cited

U.S. PATENT DOCUMENTS

| | | | |
|---|---|---|---|
| 4,351,516 A * | 9/1982 | Ersoy et al. ...................... 269/27 |
| 4,508,327 A * | 4/1985 | Ersoy .............................. 269/23 |
| 5,192,058 A | 3/1993 | VanDalsem et al. |
| 5,927,700 A | 7/1999 | Yonezawa |
| 7,029,000 B2 * | 4/2006 | Petit et al. ....................... 269/47 |
| 7,290,480 B2 * | 11/2007 | Rentz .............................. 92/136 |
| 7,574,953 B2 * | 8/2009 | Tanaka ........................... 92/136 |
| 2003/0090047 A1 * | 5/2003 | Yonezawa et al. .............. 269/24 |
| 2012/0292843 A1 * | 11/2012 | Yokota ............................ 269/20 |

FOREIGN PATENT DOCUMENTS

| | | |
|---|---|---|
| CN | 201250818 Y | 6/2009 |
| TW | 200934626 A | 8/2009 |

* cited by examiner

*Primary Examiner* — Lee D Wilson
*Assistant Examiner* — Nirvana Deonauth
(74) *Attorney, Agent, or Firm* — Novak Druce Connolly Bove + Quigg LLP

(57) ABSTRACT

A rotating cylinder includes and a main body, a piston head, a piston rod and a guide assembly. The piston head slidably is received within the main body. The piston rod partially received within the main body, the piston head is fixed to the piston head, the piston rod defines one or more guiding groove adjacent to the piston head, the guiding groove includes a straight portion, a first helix portion and a second helix portion, the straight portion extends axially toward the piston head, the first helix portion curvedly extends away from the straight portion toward the piston head, the second helix portion curvedly extends from an end of the first helix portion toward a direction away from the piston head and the straight portion. The guide assembly is mounted on the main body and includes one or more guiding member slidably engaged with the guiding groove.

12 Claims, 5 Drawing Sheets

ROTATING CYLINDER

BACKGROUND

1. Technical Field

The present disclosure relates to a cylinder, and more particularly, to a rotating cylinder.

2. Description of Related Art

A rotating cylinder is typically employed to clamp a workpiece in industrial usages. The rotating cylinder includes a piston rod defining a guide groove surrounding a periphery. A press plate may be dragged by the piston rod downward and be rotated about 90 degrees to clamp the workpiece on a support plate. When the workpiece has been machined, the press plate is pushed upward by the piston rod rotating backward about 90 degrees to release the workpiece. However, in the clamping process, the piston rod extends through the workpiece, at the same time the loading and offloading process of the workpiece on the support plate may interfere with the presence and movement of the piston rod, thus contact between the workpiece and the piston rod occurs quite easily, and this contact may result in damage to the appearance of the workpiece.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
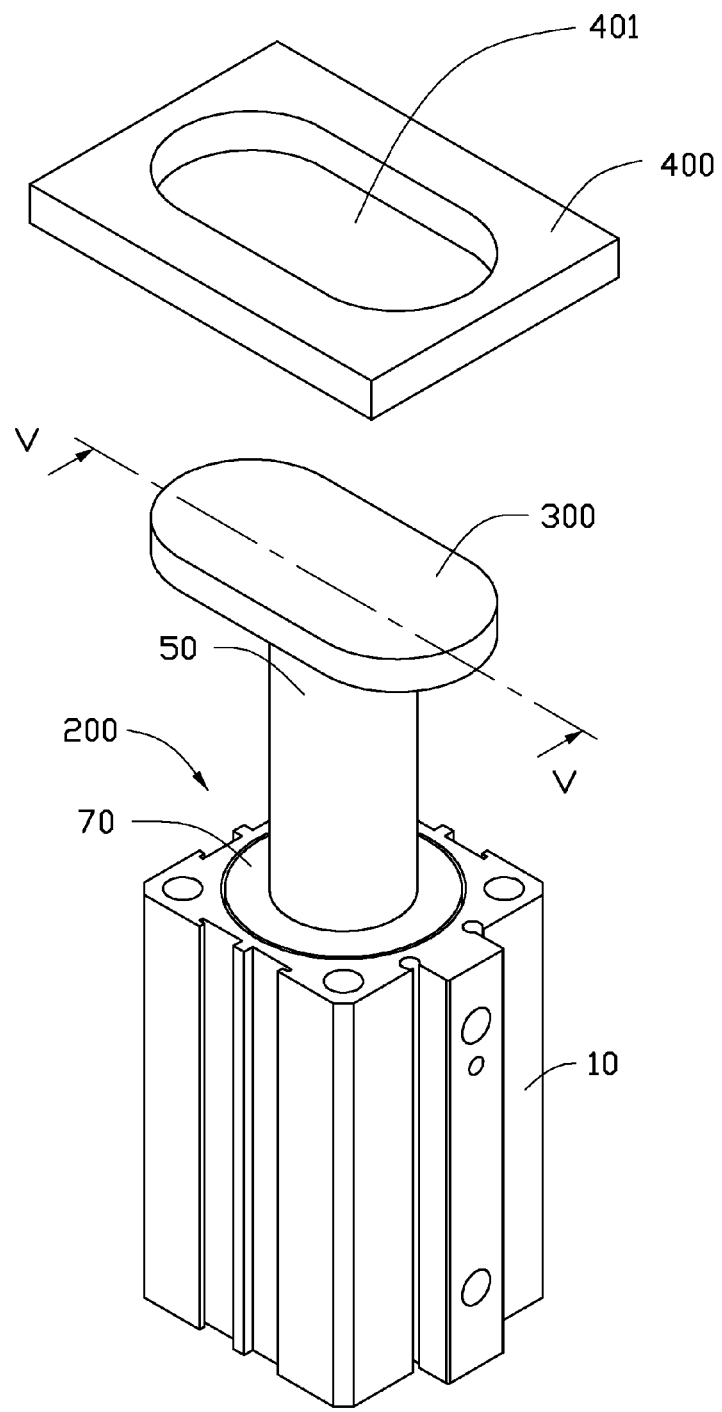
FIG. 1 is an assembled, isometric view of an embodiment of a rotating cylinder with a press plate and a support plate.
Figure 2:
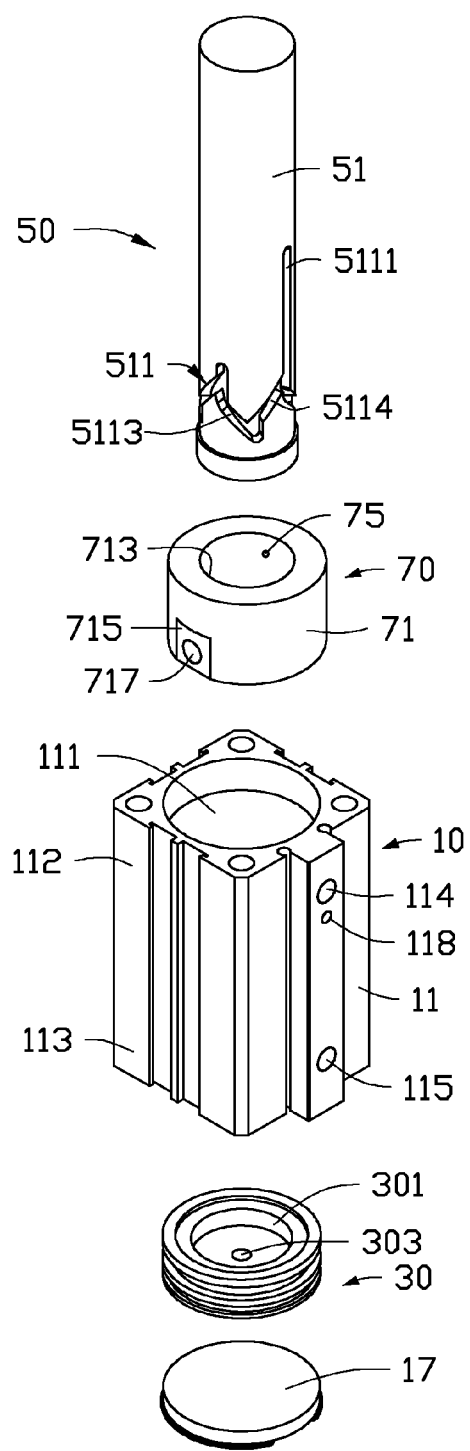
FIG. 2 is an exploded, isometric view of the rotating cylinder of FIG. 1, the rotating cylinder having a piston rod.
Figure 5:
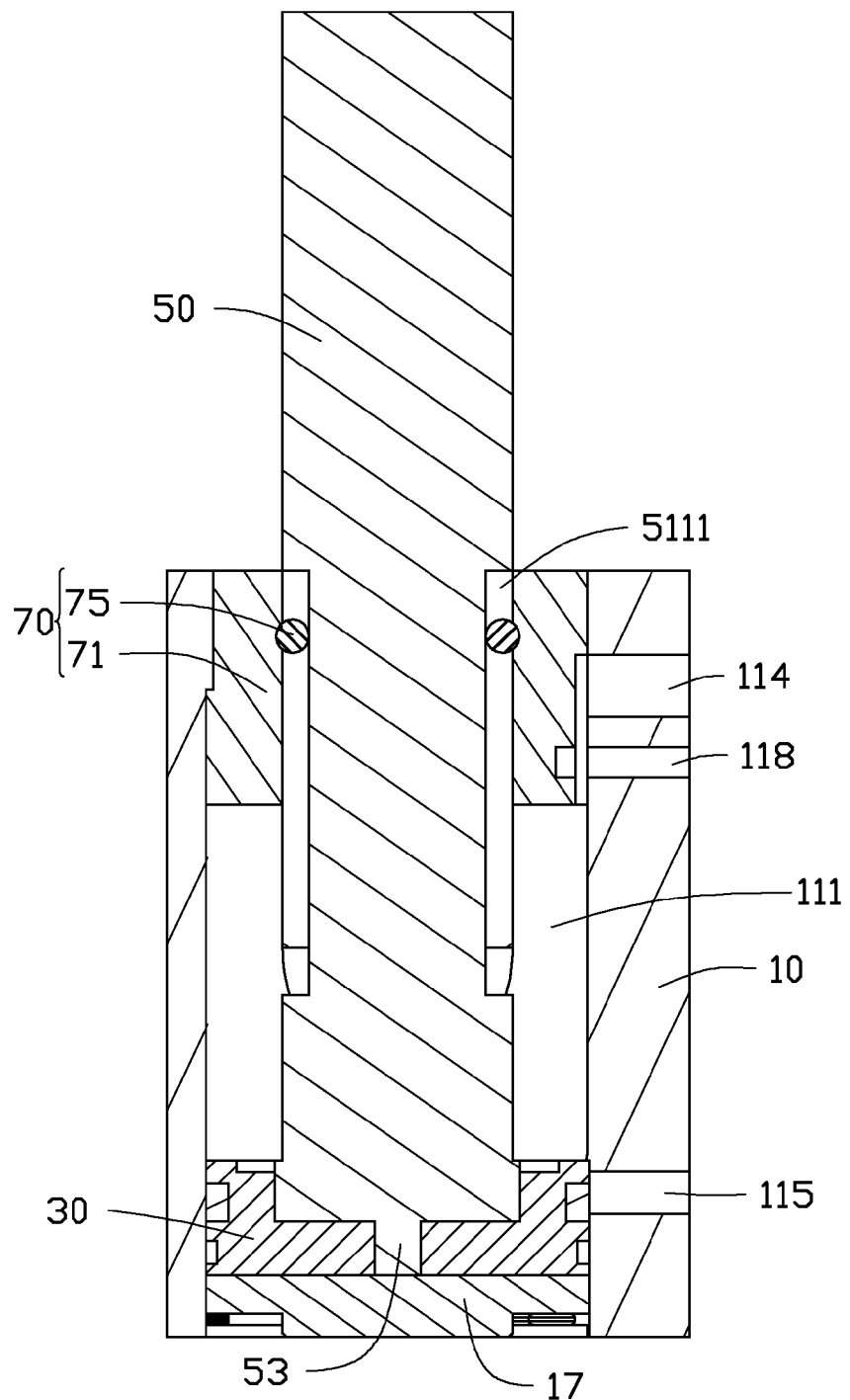
FIG. 5 is cross-sectional view of the rotating cylinder of FIG. 1, taken along line V-V.

FIGS. 1, 2, and 5 show an embodiment of a rotating cylinder 200 with a press plate 300 and a support plate 400. The rotating cylinder 200 includes a main body 10, a piston head 30, a piston rod 50 and a guiding assembly 70. The guiding assembly 70 is fixedly received in the main body 10, the piston rod 50 passes through and engages with the guiding assembly 70. The piston head 30 is fixed to an end of the piston rod 50 and slidably received in the main body 10. The press plate 300 is fixed to an end of the piston rod 50 extending out of the main body 10. The support plate 400 is located above the rotating cylinder 200 and defines a through hole 401 for allowing the press plate 300 to pass therethrough. In the embodiment, the through hole 401 is substantially kidney shaped. The press plate 300 has a shape similar to the through hole 401 and a size less than the through hole 401. A workpiece (not shown) is located on the support plate 400, and the workpiece defines a hole of the same size as the through hole 401 of the support plate 400, thereby allowing the press plate 300 to pass therethrough.

The main body 10 includes a casing 11 and a sealing plate 17 for sealing the casing 11. The casing 11 includes a first end 112 and a second end 113 located opposite to the first end 112. The casing 11 axially defines a receiving chamber 111 extending through the first end 112 and the second end 113. The casing 11 further defines a first air hole 114 and a fixing hole 118 on the first end 112, and a second air hole 115 on the second end 113. The first air hole 114, the second air hole 115 and the fixing hole 118 are communicating with the receiving chamber 111 respectively. The fixing hole 118 is located between the first air hole 114 and the second air hole 115, and adjacent to the first air hole 114. The sealing plate 17 is fixedly mounted on the second end 113 and received in the receiving chamber 111.

The piston head 30 is slidably received in the receiving chamber 111 and capable of sliding along an axial direction of the main body 10. The piston head 30 defines a connecting groove 301 at an end of the piston head 30 and a connecting hole 303 on a bottom of the connecting groove 301. The piston rod 50 is connected to the piston head 30 via the connecting groove 301 and the connecting hole 303.

Figure 3:
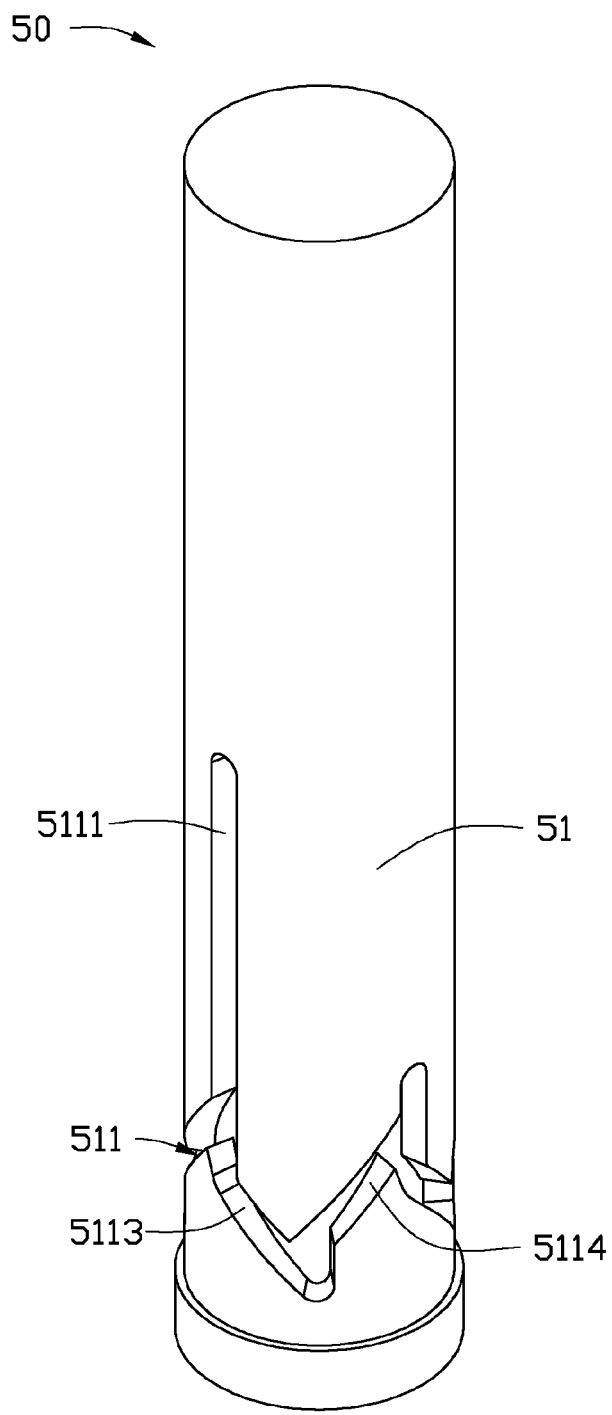
FIG. 3 is an enlarged, isometric view of the piston rod of the rotating cylinder of FIG. 2.
Figure 4:
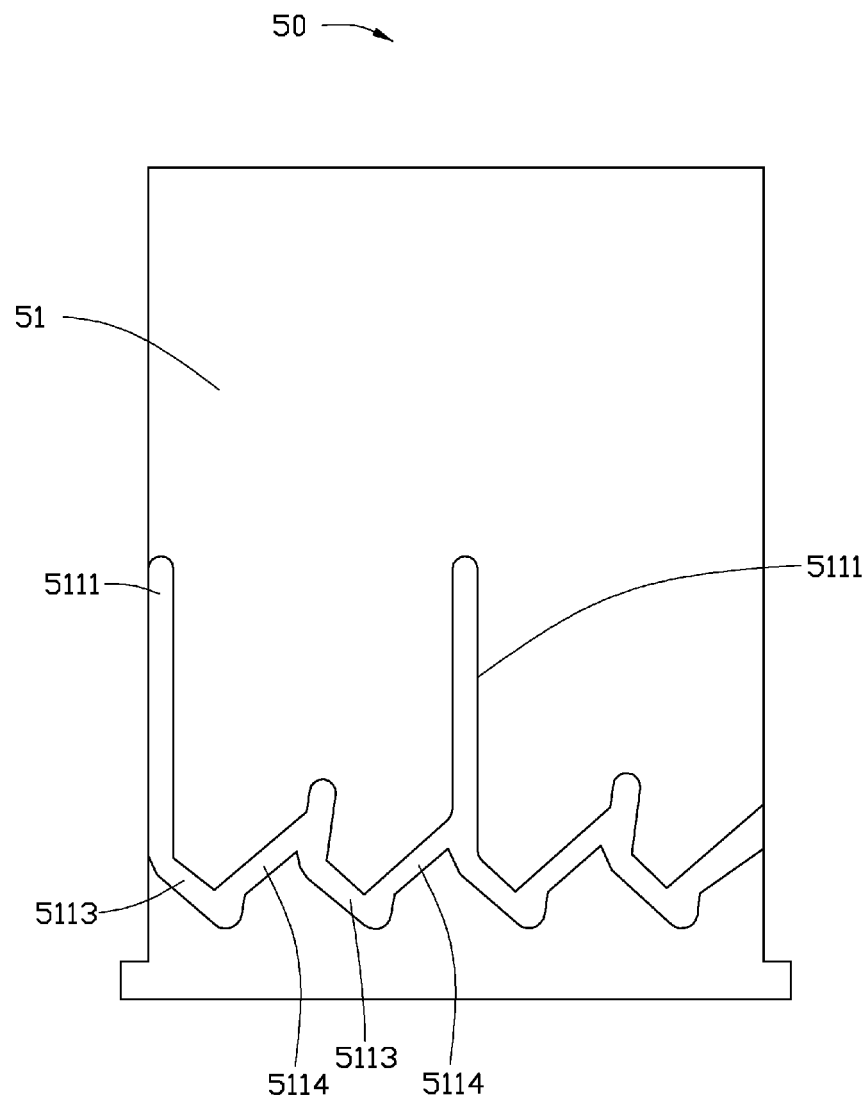
FIG. 4 is an extension plan view of the piston rod of FIG. 3.

Referring to FIGS. 3 and 5, the piston rod 50 includes a shaft body 51 and a connecting portion 53 connected to an end of the shaft body 51. The shaft body 51 is partially received in the connecting groove 301, and the connecting portion 53 is fixedly received in the connecting hole 303 of the piston head 30.

The shaft body 51 defines a pair of guiding grooves 511 adjacent to the connecting portion 53. The pair of guiding grooves 511 connects with each other and surrounds a periphery of the shaft body 51. Each guiding groove 511 includes a straight portion 5111, a pair of first helix portions 5113 and a pair of second helix portions 5114. The straight portion 5111, one first helix portion 5113, one second helix portion 5114, the other one first helix portion 5113 and the other one second helix portion 5114 are connected to each other in that order. The straight portion 5111 extends axially toward the connecting portion 53. Each first helix portion 5113 extends along a curve away from the straight portion 5111 toward the connecting portion 53. Each second helix portion 5114 extends along a curve away from an end of one first helix portion 5113 toward a direction away from the connecting portion 53 and the straight portion 5111. The second helix portion 5114 located at the end of one of the guiding groove 511 connects with the straight portion 5111 of the other guiding groove 511 (located adjacent to the one guiding groove 511).

Referring to FIGS. 2 and 5, the guiding assembly 70 is received in the receiving chamber 111 and fixedly mounted on the first end 112 of the main body 10. The guiding assembly 70 includes a fixing member 71 and a pair of guiding members 75 mounted on the fixing member 71. The fixing member 71 has substantially an annular shape, and axially defines an engaging hole 713 for allowing the piston rod 50 to pass through. The pair of guiding members 75 are received in the engaging hole 713 and mounted on an inner sidewall of the fixing member 71. The pair of guiding members 75 are opposite to each other, and are respectively engaged with the pair of guiding grooves 511 of the piston rod 50. In the embodiment, the pair of guiding members 75 is ball shaped. The fixing member 71 further defines a cutting surface 715 on a periphery thereof, and a mounting hole 717 on the cutting surface 715 corresponding to the fixing hole 118 of the main body 10.

When in assembly, the sealing plate 17 is mounted on the second end 113 of the main body 10. The piston head 30 is mounted on an end of the piston rod 50, and is slidably received in the receiving chamber 111 of the main body 10. The guiding assembly 70 is received in the receiving chamber 111, and is fixedly mounted on the first end 112 of the casing 11. The pair of guiding members 75 is respectively received in the pair of guiding grooves 511 of the piston rod 50.

When in use, the press plate 300 is fixed to an end of the piston rod 50, and air is supplied to the receiving chamber 111 via the first air hole 114, thus such that the piston head 30 is pushed toward the sealing plate 17. The pair of guiding members 75 respectively moves along in the pair of straight portions 5111 of the guiding groove 511. The piston rod 50 slides linearly toward the sealing plate 17 until the piston head 30 reaches the sealing plate 17, such that the press plate 300 is dragged by the piston rod 50 to a first limit position which is located at a lowest position below the support plate 400. In the embodiment, a workpiece is loaded on the support plate 400, the hole of the workpiece communicates with the through hole 401 of the support plate 400.

Air is supplied to the receiving chamber 111 via the second air hole 115, and the piston head 30 is pushed toward the fixing member 71. The pair of guiding members 75 moves along the pair of straight positions 5111 toward the first helix portions 5113. The press plate 300 is pushed by the piston rod 50 linearly toward the support plate 400 and passes through the through hole 401. When the pair of guiding members 75 reaches and move along in the first helix portions 5113 of the guiding groove 511, the piston rod 50 continues to move upward and is rotated by the pair of guiding members 75. When the pair of guiding members 75 reach the second helix portions 5114, the press plate 300 is rotated by the piston rod 50 at about 45 degrees, and pushed to a second limit position which is located at the highest position above the support plate 400.

Then, air is supplied to the receiving chamber 111 via the first air hole 114 for a second time, which pushes the piston head 30 toward the sealing plate 17. The pair of guiding members 75 moves in the pair of second helix portions 5114 of the guiding grooves 511, respectively. The piston rod 50 moves downward and continues to be rotated by the pair of guiding members 75 along a same direction. When the pair of guiding members 75 reaches the other first helix portion 5113, the press plate 300 is rotated by the piston rod 50 at about 90 degrees in a same direction. Then the press plate 300 reaches a third limit position which is located between the first limit position and the second limit position. The press plate 300 is arranged perpendicular to the workpiece and resists the workpiece on the support plate 400 from an upper side. The workpiece is then machined.

Then, air is supplied to the receiving chamber 111 via the second air hole 115 for another time, and the piston head 30 is pushed upward. The pair of guiding members 75 moves along in the other first helix portions 5113, the press plate 300 is pushed upward and rotated by the piston rod 50. When the pair of guiding members 75 reach the other second helix portions 5114, the press plate 300 reaches the second limit position again, and the press plate 300 is rotated about 135 degrees in a same direction. In the following process, the pair of guiding members 75 slides in the second helix portions 5114, the press plate 300 moves downward and reaches the support plate 400 again. At this time, the press plate 300 has been rotated at about 180 degrees in a same direction. Then the pair of guiding members 75 slides in the pair of straight portions 5111, and the press plate 300 is dragged by the piston rod 50 downward and passes through the through hole 401 of the support plate 400, such that the press plate 300 reaches the first limit position. The machined workpiece on the support plate 400 is released for unloading.

The piston rod 50 may define a plurality of guiding grooves 511 spaced from each other. The number of the guiding members 75 may be changed accordingly. The guiding groove 511 includes a straight portion 5111, a first helix portion 5113, and a second helix portion 5114 connected in that order. When the guiding member 75 reaches an end of second helix portion 5114, the press plate 300 has passed the first limit position, the second limit position and the third limit position, and is rotated at about 90 degrees. Then the press plate 300 moves backward.

The pair of guiding members 75 may be a pair of ball protrusions or bearings formed on the inner sidewall of the engaging hole 713. The shapes of the press plate 300 and the through hole 401 may be changed according to the shape of the workpiece.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A rotating cylinder, comprising:
   a main body;
   a piston head slidably received within the main body;
   a piston rod partially received within the main body, wherein the piston head is fixed to an end of the piston rod, the piston rod defines at least one guiding groove adjacent to the piston head, the guiding groove comprising a straight portion, a first helix portion and a second helix portion, the straight portion extending axially toward the piston head, the first helix portion curvedly extending away from the straight portion toward the piston head, the second helix portion curvedly extending from an end of the first helix portion toward a direction away from the piston head and the straight portion; and
   a guiding assembly mounted on the main body and comprising at least one guiding member engaging with the at least one guiding groove, wherein when the at least one guiding member reaches the second helix portion, the piston rod reaches a highest position and is rotated at about 45 degrees; when the at least one guiding member reaches an end of the second helix portion, the piston rod reaches a middle position and is rotated at about 90 degrees in a same direction to clamp a workpiece.

2. The rotating cylinder of claim 1, wherein the guiding assembly further comprises a fixing member axially defining an engaging hole thereon, the piston rod passes through the engaging hole, the at least one guiding member is mounted on an inner sidewall of the fixing member and engages with the at least one guiding groove of the piston rod.

3. The rotating cylinder of claim 2, wherein the main body comprises a casing and a sealing plate sealing the casing, the casing axially defines a receiving chamber thereon receiving the guiding assembly, the piston head and the piston rod.

4. The rotating cylinder of claim 3, wherein the casing comprises a first end and a second end at opposite ends thereof, the receiving chamber extending through the first end and the second end, the casing further defines a first air hole and a fixing hole on the first end, and a second air hole on the second end, the first air hole, the second air hole and the fixing hole communicating with the receiving chamber, respectively.

5. The rotating cylinder of claim 4, wherein the fixing member further defines a cutting surface on an end of a periphery thereof, and a mounting hole on the cutting surface corresponding to the fixing hole of the main body.

6. The rotating cylinder of claim 1, wherein the piston head defines a connecting groove at an end thereof and a connecting hole on a bottom of the connecting groove, the piston rod comprises a shaft body and a connecting portion connected to an end of the shaft body, the shaft body is partially received in the connecting groove, the connecting portion is fixedly received in the connecting hole of the piston head, the at least one guiding groove is defined on the shaft body.

7. A rotating cylinder, comprising:
a main body;
a piston head slidably received within the main body;
a piston rod partially received within the main body, wherein the piston head is fixed to an end of the piston rod, the piston rod defines a pair of guiding grooves adjacent to the piston head, the pair of guiding grooves connects with each other and surround a periphery of the piston rod, each guiding groove comprises a straight portion, a pair of first helix portions and a pair of second helix portions, the straight portion, one first helix portion, one second helix portion, the other one first helix portion and the other one second helix portion are connected to each other in that order, the straight portion extends axially toward the piston head, each first helix portion curvedly extends away from the straight portion toward the piston head, each second helix portion curvedly extends from an end of one first helix portion toward a direction away from the piston head and the straight portion, the second helix portion at the end of the guiding groove connects with the straight portion of the other guiding groove; and
a guiding assembly mounted on the main body and comprising a pair of guiding members respectively engaging with the pair of guiding grooves, wherein when the guiding member reaches the first helix portion between the two second helix portions, the piston rod is rotated for about 90 degrees and reaches a middle position to clamp a workpiece; when the guiding member reaches an end of the second helix portion connecting to the other guiding groove, the piston rod is rotated for about 180 degrees in the same direction and reaches a middle position to release the workpiece.

8. The rotating cylinder of claim 7, wherein the guiding assembly further comprises a fixing member axially defining an engaging hole thereon, the piston rod passes through the engaging hole, the pair of guiding members are mounted on an inner sidewall of the fixing member opposite to each other and respectively engage with the pair of guiding grooves of the piston rod.

9. The rotating cylinder of claim 8, wherein the main body comprises a casing and a sealing plate sealing the casing, the casing axially defining a receiving chamber thereon receiving the guiding assembly, the piston head and the piston rod.

10. The rotating cylinder of claim 9, wherein the casing comprises a first end and a second end at opposite ends thereof, the receiving chamber cuts through the first end and the second end of the casing, the casing further defines a first air hole and a fixing hole on the first end, and a second air hole on the second end, the first air hole, the second air hole and the fixing hole communicating with the receiving chamber.

11. The rotating cylinder of claim 10, wherein the fixing member further defines a cutting surface on an end of a periphery thereof, and a mounting hole on the cutting surface corresponding to the fixing hole of the main body.

12. The rotating cylinder of claim 7, wherein the piston head defines a connecting groove at an end thereof and a connecting hole on a bottom of the connecting groove, the piston rod comprises a shaft body and a connecting portion connected to an end of the shaft body, the shaft body is partially received in the connecting groove, the connecting portion is fixedly received in the connecting hole of the piston head, the pair of guiding grooves are defined on the shaft body.

* * * * *